(12) United States Patent
Rowell

(10) Patent No.: US 10,573,035 B2
(45) Date of Patent: *Feb. 25, 2020

(54) SYSTEMS AND METHODS FOR RENDERING VISUALIZATIONS IN AN INTEREST-DRIVEN BUSINESS INTELLIGENCE SYSTEM

(71) Applicant: Workday, Inc., Pleasanton, CA (US)

(72) Inventor: Eric Rowell, San Mateo, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,014

(22) Filed: Apr. 10, 2018

(65) Prior Publication Data

US 2018/0365872 A1 Dec. 20, 2018

Related U.S. Application Data

(63) Continuation of application No. 15/196,871, filed on Jun. 29, 2016, now Pat. No. 9,972,104.

(60) Provisional application No. 62/186,142, filed on Jun. 29, 2015.

(51) Int. Cl.
*G06T 11/20* (2006.01)
*G06T 13/00* (2011.01)
*G06Q 10/06* (2012.01)

(52) U.S. Cl.
CPC ............ *G06T 11/206* (2013.01); *G06T 13/00* (2013.01); *G06Q 10/0637* (2013.01)

(58) Field of Classification Search
CPC ..................... G06T 13/00–80; G06T 11/206
See application file for complete search history.

(56) References Cited

U.S. PATENT DOCUMENTS

| | | |
|---|---|---|
| 8,243,064 B1 | 8/2012 | Moravanszky |
| 2006/0200327 A1 | 9/2006 | Bordes |
| 2011/0025717 A1 | 2/2011 | Gilmore |
| 2012/0081382 A1 | 4/2012 | Lindahl |

*Primary Examiner* — Charles Tseng
(74) *Attorney, Agent, or Firm* — Van Pelt, Yi & James LLP

(57) ABSTRACT

Systems and methods for rendering displays in interest-driven business intelligence data visualization system of an inter-driven business intelligence system in accordance with some embodiments of the invention are illustrated. In one embodiment, an interest-driven data visualization system includes a processor, a memory configured to store an interest-driven business intelligence application, memory storing reporting data and metadata for the reporting data. The interest-driven business intelligence application includes a rendering process that adjusts the level of robustness of the rendered displays based upon current system performance information. Furthermore, the inter-driven business intelligence application may also include a table scrolling rendering process that periodically determines the location within the table and determines a viewport for the location. The viewport is then rendered and provided to the display.

16 Claims, 11 Drawing Sheets

SYSTEMS AND METHODS FOR RENDERING VISUALIZATIONS IN AN INTEREST-DRIVEN BUSINESS INTELLIGENCE SYSTEM

CROSS-REFERENCE TO RELATED APPLICATIONS

This application is a continuation of co-pending U.S. patent application Ser. No. 15/196,871, entitled SYSTEMS AND METHODS FOR RENDERING VISUALIZATIONS IN AN INTEREST-DRIVEN BUSINESS INTELLIGENCE SYSTEM filed Jun. 29, 2016 which is incorporated herein by reference for all purposes, which claims priority to U.S. Provisional Application No. 62/186,142, entitled SYSTEMS AND METHODS FOR RENDERING VIUALIZATIONS IN AN INTEREST-DRIVEN BUSINESS INTELLIGENCE SYSTEM filed Jun. 29, 2015 which is incorporated herein by reference for all purposes.

FIELD OF THE INVENTION

The present invention relates to business intelligence systems, specifically the visualization of data using interest-driven business intelligence systems.

BACKGROUND

Business intelligence refers to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data, for example, business data. Data warehouses utilize databases to store, analyze, and harness the data in a productive and cost-effective manner. A variety of databases are commonly utilized, such as a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema that looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for rendering visualizations in an interest-driven business intelligence system in accordance with some embodiments of the invention are disclosed. In one embodiment, an interest-driven business intelligence data visualization system includes a processor, a memory readable by the processor, and an interest-driven business intelligence data visualization system application stored in the memory that when read by the processor directs the processor to render displays at a current rendering level where the current rendering level is a first one of a plurality of rendering, receive current system performance level information that indicates the amount of system resources available, compare the current system performance level information to a threshold value, and adjust the current rendering level to a second rendering level based upon a result of comparing the current system performance level information to the threshold value where the second rendering level is a second one of the plurality of rendering levels.

In another embodiment of the invention, the plurality of rendering levels include an animation level, an intermediate level, and a progressive level where the animation level is the most robust of the plurality of rendering levels and immediately renders all frames of the display to provide a fluid smooth display, the intermediate level is less robust rendering level and renders frames that include a state transition in the frame and drops other intermediate frames are dropped, and the progressive level is the least robust level and renders a portion of the data in each frame.

In an additional embodiment of the invention, the interest-driven business intelligence data visualization system application further directs the processor to begin rendering in the animation level where the comparing to a threshold includes comparing the current system performance level information to a high performance level threshold where the high performance level threshold indicates that the system is using a high amount of resources and the adjusting includes changing to a less robust one of the plurality of rendering levels.

In yet another additional embodiment of the invention, the current rendering level is the intermediate level and the comparing to a threshold includes comparing the current system performance level information to a high performance level threshold where the high performance level threshold indicates that the system is using a high amount of resources and comparing the current system performance level information to a low performance level threshold where the low performance level threshold indicates that the system is using a low amount of resources, and where the adjusting includes changing to a more robust one of the plurality of robust levels in response to the current system performance level information is greater than the low performance level threshold and adjusting the current rendering level to a less robust one of the plurality of rendering levels in response to the current system performance level information being greater than the high performance level threshold.

In still another additional embodiment of the invention, the current rendering level is the progressive level and the comparing to a threshold includes comparing the current system performance level information to a low performance level threshold where the low performance level threshold indicates that the system is using a low amount of resources, and where the adjusting includes changing to a more robust one of the plurality of robust levels in response to the current system performance level information is greater than the low performance level threshold.

In yet still another additional embodiment of the invention, the comparing to a threshold includes comparing the current system performance level information to a low performance level threshold where the low performance level threshold indicates that the system is using a low amount of resources, and where the adjusting of the current rendering level includes changing to a more robust one of the plurality of robust levels in response to the current system performance level information is greater than the low performance level threshold.

In yet another embodiment of the invention, the comparing to a threshold includes comparing the current system performance level information to a high performance level threshold where the high performance level threshold indicates that the system is using a high amount of resources and the adjusting current rending level includes changing to a less robust one of the plurality of rendering levels.

In still another embodiment of the invention, the receiving of the current system performance level information includes receiving the information from a system monitoring system performance of the interest-driven business intelligence system.

In yet still another embodiment of the invention, the receiving of the current system performance level information includes monitoring system performance of the interest-driven business intelligence system and generating the current system performance level information.

In yet another additional embodiment of the invention, the current system performance level information includes at least one parameter selected from a group consisting of CPU usage and RAM usage.

Still another embodiment of the invention includes a method for generating displays in an interest-driven business intelligence system using an interest-driven business intelligence data visualization system that includes a processor and memory that stores instructions for performing the method, the method including rendering displays at a current rendering level using the interest-driven business intelligence data visualization system where the current rendering level is a first one of a plurality of rendering, receiving current system performance level information that indicates the amount of system resources available using the interest-driven business intelligence data visualization system, comparing the current system performance level information to a threshold value using the interest-driven business intelligence data visualization system, and adjusting the current rendering level to a second rendering level based upon a result of comparing the current system performance level information to the threshold value using the interest-driven business intelligence data visualization system where the second rendering level is a second one of the plurality of rendering levels.

In yet another additional embodiment of the invention, the plurality of rendering levels include an animation level, an intermediate level, and a progressive level where the animation level is the most robust of the plurality of rendering levels and immediately renders all frames of the display to provide a fluid smooth display, the intermediate level is less robust rendering level and renders frames that include a state transition in the frame and drops other intermediate frames are dropped, and the progressive level is the least robust level and renders a portion of the data in each frame.

In still another additional embodiment of the invention, the method includes beginning rendering in the animation level and the comparing to a threshold includes comparing the current system performance level information to a high performance level threshold where the high performance level threshold indicates that the system is using a high amount of resources and the adjusting includes changing to a less robust one of the plurality of rendering levels.

In yet still another additional embodiment of the invention, the current rendering level is the intermediate level, the comparing to a threshold includes comparing the current system performance level information to a high performance level threshold where the high performance level threshold indicates that the system is using a high amount of resources and comparing the current system performance level information to a low performance level threshold where the low performance level threshold indicates that the system is using a low amount of resources, and the adjusting includes changing to a more robust one of the plurality of robust levels in response to the current system performance level information is greater than the low performance level threshold and adjusting the current rendering level to a less robust one of the plurality of rendering levels in response to the current system performance level information being greater than the high performance level threshold.

In yet another embodiment of the invention, wherein the current rendering level is the progressive level and the comparing to a threshold includes comparing the current system performance level information to a low performance level threshold where the low performance level threshold indicates that the system is using a low amount of resources, and where the adjusting includes changing to a more robust one of the plurality of robust levels in response to the current system performance level information is greater than the low performance level threshold.

In still another embodiment of the invention, the comparing to a threshold includes comparing the current system performance level information to a low performance level threshold where the low performance level threshold indicates that the system is using a low amount of resources, and where the adjusting of the current rendering level includes changing to a more robust one of the plurality of robust levels in response to the current system performance level information is greater than the low performance level threshold.

In yet still another embodiment of the invention, the comparing to a threshold includes comparing the current system performance level information to a high performance level threshold where the high performance level threshold indicates that the system is using a high amount of resources and the adjusting current rending level includes changing to a less robust one of the plurality of rendering levels.

In yet another additional embodiment of the invention, the receiving of the current system performance level information includes receiving the information from a system monitoring system performance of the interest-driven business intelligence system.

In still another additional embodiment of the invention, the receiving of the current system performance level information includes monitoring system performance of the interest-driven business intelligence system and generating the current system performance level information.

In yet still another additional embodiment of the invention, the current system performance level information includes at least one parameter selected from a group consisting of CPU usage and RAM usage.

DETAILED DISCLOSURE OF THE INVENTION

Figure 1:
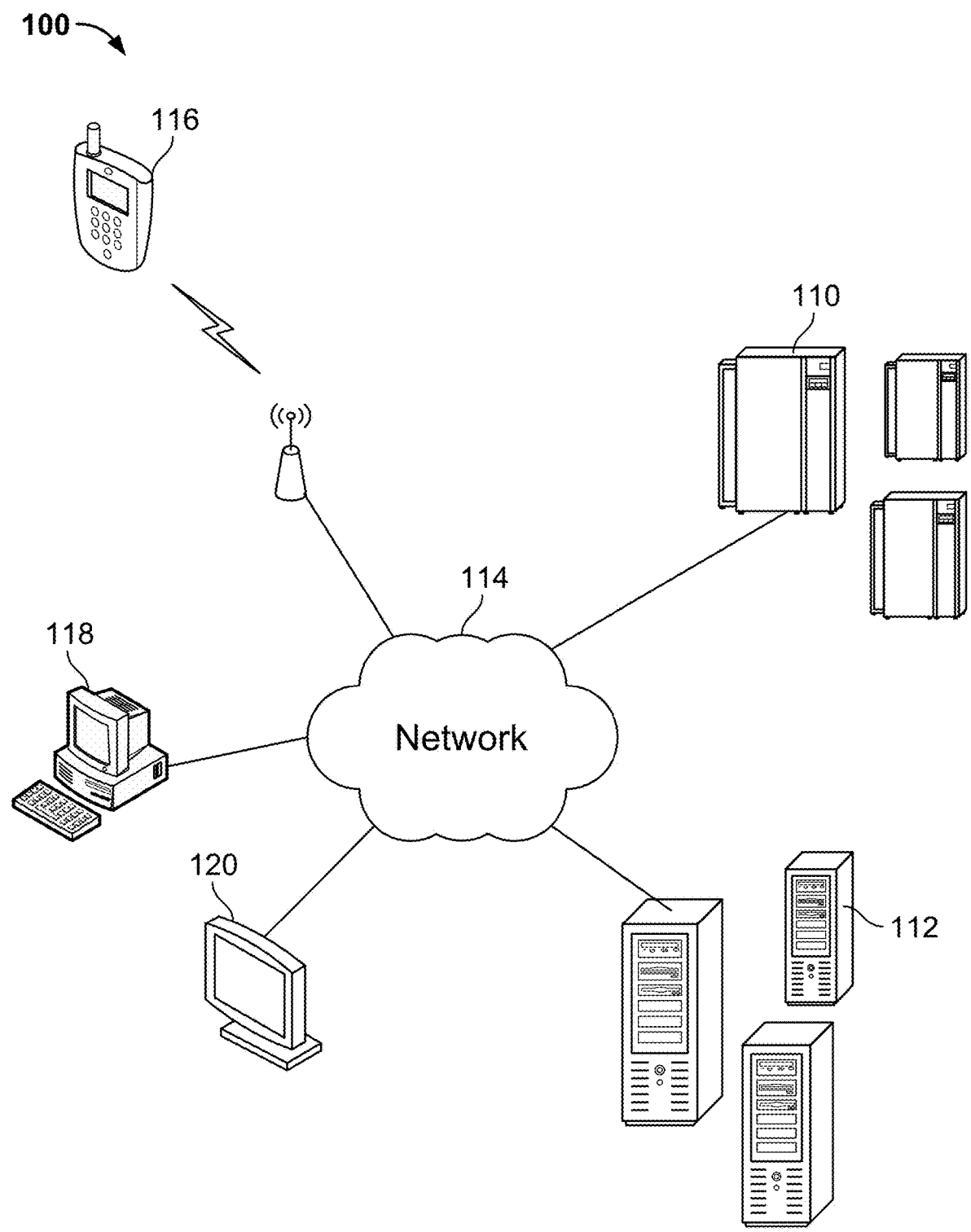
FIG. 1 is a network diagram of a business intelligence system including an interest-driven data sharing server system in accordance with an embodiment of the invention.

Turning now to the drawings, interest-driven business intelligence systems in accordance with embodiments of the invention are illustrated. Interest-driven business intelligence systems enable analysts to create reporting data using raw data retrieved from various systems and, at the same time, to dynamically create new reporting data by efficiently re-using and updating data previously retrieved from the interest-driven business intelligence system. Interest-driven business intelligence systems are configured to dynamically build an interest-driven data pipeline to provide analysts with information of interest. Interest-driven business intelligence systems are capable of managing huge datasets in a way that provides an analyst with complete visibility into the available data utilizing metadata provided by an interest-driven business intelligence system and the ability to dynamically reconfigure the interest-driven data pipeline to provide access to desired information stored in the interest-driven business intelligence system. In order to achieve highly interactive performance, an interest-driven business intelligence server system dynamically compiles an interest-driven data pipeline to create reporting data based on the reporting data requirements and reporting data currently present in the interest-driven business intelligence server system. Changes specified at the report level can be automatically compiled and traced backward by the interest-driven business intelligence server system to create an appropriate interest-driven data pipeline to meet the new report requirements. Interest-driven business intelligence server systems further build metadata concerning the data available in the interest-driven business intelligence system and provide the metadata to interest-driven data visualization systems to enable the construction of reports using the metadata. Available data in an interest-driven business intelligence system includes, but is not limited to, raw data, aggregate data, filtered data, and reporting data. Interest-driven business intelligence systems that can be utilized in accordance with embodiments of the invention are discussed further in U.S. Pat. No. 8,447,721 to Eshleman et al., titled "Interest-Driven Business Intelligence Systems and Methods of Data Analysis Using Interest-Driven Data Pipelines" and issued May 21, 2013, the entirety of which is incorporated herein by reference.

In many embodiments, reports can be created using interest-driven data visualization systems configured to request and receive data from an interest-driven data sharing server system. In order for an interest-driven data visualization system to build reports, a set of reporting data requirements are defined. These requirements specify the reporting data, derived from raw data that will be utilized to generate the reports. The raw data can be structured, semi-structured, or unstructured. In a variety of embodiments, structured and semi-structured data include metadata, such as an index or other relationships, describing the data; unstructured data lacks any definitional structure. An interest-driven business intelligence server system can utilize reporting data already created by the interest-driven data sharing server system and/or cause new and/or updated reporting data to be generated by the interest-driven data sharing server system to satisfy the reporting data requirements. In a variety of embodiments, reporting data requirements are received from interest-driven data visualization systems based upon reporting requirements defined by analysts exploring metadata describing raw data stored in an interest-driven business intelligence system. Systems and methods for interest-driven data visualizations systems which may be utilized in accordance with a number of embodiments are described in U.S. Patent Publication No. 2014/0114970 to Prabhu et al., titled "Systems and Methods for Interest-Driven Data Visualization Systems Utilized in Interest-Driven Business Intelligence Systems" and filed Mar. 8, 2013, the entirety of which is incorporated by reference.

In accordance with some embodiments, an interest-driven business intelligence visualization system receives the reporting data and provides visualizations of the reporting data based upon visualization instructions received from a user. To provide the visualizations, an interest-driven business intelligence visualization system renders displays generated based upon the visualization instructions. In accordance with many embodiments, the quality of displays rendered may be adjusted based upon current system performance information about the interest-driven business intelligence visualization system.

In accordance with a number of these embodiments, the rendering process may be performed at various levels based upon the current system performance information. The levels can include a high performance, animation level that is used when the current system performance is low, an intermediate level that is used when the current system performance is above an intermediate threshold, and a progressive level that is used when current system performance is above a high threshold. In the animation level, all frames are animated to provide a high quality display. In the intermediate level, only frames that include a state transition in the reporting data are immediately rendered. In the progressive level, chunks of the data are rendered in each frame. In accordance with some embodiments, the animation level is used with low cardinality reporting data, the intermediate level is used with high cardinality reporting data, and the progressive level is used with super high cardinality reporting data.

In accordance with some embodiments, the rendering process includes the following monitoring process to change between rendering levels in accordance with some embodiments of the invention. The rendering process begins using a most robust level of processing. The system then receives current system performance information. In accordance with some embodiments, the process may monitor the system performance. In accordance with some other embodiments, the process may receive the current system performance information from a system monitoring process being performed by the interest-driven business visualization system. The current system performance information is compared to a lower performance threshold and/or an upper performance level for the current rendering level. If the current system performance information is less than the lower performance threshold for the current rendering level, the process switches the rendering process to a next more robust level of rendering. If the current system performance information is greater than the high performance threshold level, the process switches the render process to a next lesser robust rendering level. The process then periodically repeats to adjust the rendering level to the current system performance.

In accordance with some embodiments, a process for providing displays of tables including a large amount of reporting data (a million or more rows data) uses a rendering loop to continuously render the current viewport of a table to provide a fast rendering of the reporting data currently being viewed in the table. A table display process is performed in the following manner in accordance with some embodiments. The process receives current scrolling information from the system. Based upon the current scrolling information, the process determines a current table location. The process renders the viewport for the determined current table location and provides the viewport to a User Interface (UI). The process then determines if scrolling is complete. If not, the process repeats after a pre-defined amount of time.

In accordance with some embodiments of the invention, an interest-driven business intelligence visualization system provides a method for associating a data record with a pixel in a display. In accordance with some of these embodiments, each data record is associated with a unique integer and each integer is associated with a unique Red Green Blue (RGB) value. A pixel in the display associated with a particular data record is given the RGB value associated with integer identifying the particular data record.

In accordance with some of these embodiments, channel the red, the green, and the blue channels each support 255 values. Thus, each data record is associated with a base 10 integer. Each base 10 integer is then converted to a hexadecimal value. The hexadecimal value is then used generate an RGB value. The associations between the data records, integer values, hexadecimal values, and/or RGB values are stored for use in identifying the particular data records associated with pixels.

In accordance with some of these embodiments, a data record associated with a pixel is identified in the following manner. A pixel is selected. In accordance with many embodiments, the selection is an input made using an I/O device such as, a mouse or a touch on a touchscreen. The RGB value of the selected determined. The hexadecimal value associated with the RGB value is determined and converted to a base 10 integer. The base 10 integer is used to determine the associated data record.

Systems and methods for rendering visualizations of reporting in an interest-driven business intelligence system in accordance with some embodiments of the invention are discussed further below.

System Overview

An interest-driven business intelligence system in accordance with an embodiment of the invention is illustrated in FIG. 1. The interest-driven business intelligence system 100 includes a distributed computing platform 110 storing raw business data. The distributed computing platform 110 can communicate with an interest-driven business intelligence server system 112 via a network 114. In several embodiments of the invention, the network 114 is a local area network. In many embodiments, the distributed computing platform 110 communicates with the interest-driven business intelligence server system 112 via the Internet 114. In many embodiments of the invention, the distributed computing platform 110 is a cluster of computers configured as a distributed computing platform. The distributed computing platform 110 can act as a raw data storage system and a data warehouse within the interest-driven business intelligence system. In several embodiments, the interest-driven business intelligence server system 112 is also implemented using one computing device or a cluster of computing devices. In a variety of embodiments, alternative distributed processing systems are utilized.

Interest-driven data visualization systems enable users to specify reports including data visualizations that allow the user to explore the raw data stored within the distributed computing platform 110 using reporting data generated by the interest-driven business intelligence server system 112. Reporting data is provided in a variety of forms, including, but not limited to, snowflake schemas and star schemas. In many embodiments, reporting data is any data that includes fields of data populated using raw data stored within the distributed computing platform 110. The interest-driven business intelligence server system 112 is configured to communicate via the network 114 with one or more interest-driven business intelligence data visualization systems, including, but not limited to, cellular telephones 116, personal computers 118, and presentation devices 120. In many embodiments of the invention, interest-driven business intelligence data visualization systems include any computing device capable of receiving and/or displaying data. In a variety of embodiments, the displayed data includes rendered display data dynamically rendered based on the amount of data being displayed and/or the computing capabilities of the computing device.

Based upon received reporting data requirements, the interest-driven business intelligence server system 112 automatically compiles one or more interest-driven data pipelines to create or update reporting data to satisfy the received reporting data requirements. The interest-driven business intelligence server system is configured to compile one or more interest-driven data pipelines configured to create and push down jobs to the distributed computing platform 110 to create source data and then applying various filter and/or aggregation processes to the source data to produce reporting data to be transmitted to interest-driven data visualization systems. In many embodiments, the interest-driven business intelligence server system 112 includes reporting data that partially or fully satisfies the reporting data requirements. The interest-driven business intelligence server system 112 is configured to identify the relevant existing reporting data and/or previously received source data and to configure an interest-driven data pipeline to create jobs requesting reporting data minimizing the redundancy between the existing data and the new reporting data requirements. In a variety of embodiments, the interest-driven business intelligence server system 112 is configured to determine redundancies between the requested data and existing data using metadata describing the data available from an interest-driven business intelligence system. The metadata describes what raw data is available from the interest-driven business intelligence system. In a number of embodiments, the metadata further describes what form the raw data is available in, such as, but not limited to, aggregate data, filtered data, source data, and reporting data. In several embodiments, the interest-driven business intelligence server system 112 receives a plurality of reporting data requirements and the interest-driven business intelligence server system 112 is configured to create jobs using the interest-driven data pipeline to create source data containing data fulfilling the union of the plurality of reporting data requirements. In a variety of embodiments, the interest-driven business intelligence server system 112 is configured to identify redundant data requirements in one or more reporting data requirements and configure an interest-driven data pipeline to create jobs requesting source data fulfilling the redundant data requirements. In several embodiments, the interest-driven business intelligence server system 112 is configured to store aggregate data and/or reporting data in a data mart and utilized the stored aggregate data and/or reporting data to identify the redundant data requirements. In a number of embodiments, the interest-driven business intelligence server system 112 is configured to identify when reporting data requirements request updated data for existing reporting data and/or source data and configure an interest-driven data pipeline to create jobs to retrieve an updated snapshot of the existing reporting data from the distributed computing platform 110. In a variety of embodiments, redundant information is identified using reporting data schemas defining the structure of reporting data and/or source data schemas defining the structure of source data. In many embodiments, redundant information is determined using one or more files stored using the interest-driven data sharing server system; redundancies can be determined using the data contained in the files and/or metadata associated with the files, including the creation date of the files and/or the last modified date of the files.

In several embodiments, jobs pushed down to the distributed computing platform 110 by the interest-driven business intelligence server system 112 cannot be executed in a low-latency fashion. In many embodiments, the distributed computing platform 110 is configured to provide a partial set of source data fulfilling the pushed down job and the interest-driven business server system 112 is configured to create reporting data using the partial set of source data. As more source data is provided by the distributed computing platform 110, the interest-driven business intelligence server system 112 is configured to update the created reporting data based upon the received source data. In a number of embodiments, the interest-driven business intelligence server system continues to update the reporting data until a termination condition is reached. These termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based upon the time previously measured in the retrieval of source data for similar reporting data requirements.

The interest-driven business intelligence server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metrics collected based upon the performance of previously executed jobs.

Raw data storage is utilized to store raw data, metadata storage is utilized to store data description metadata describing the raw data, and/or report storage is utilized to store previously generated reports including previous reporting data and previous reporting data requirements in a variety of embodiments of the invention. Raw data storage, metadata storage, and/or report storage can be a portion of the memory associated with the interest-driven business intelligence server system 112, the distributed computing platform 110, and/or a separate device in accordance with the specific requirements of specific embodiments of the invention.

Although a specific architecture for an interest-driven business intelligence system with an interest-driven business intelligence server system in accordance with an embodiment of the invention is conceptually illustrated in FIG. 1, any of a variety of architectures configured to store large data sets and to automatically build interest-driven data pipelines based upon reporting data requirements can also be utilized. Systems and methods for interest-driven data sharing server systems in accordance with embodiments of the invention are discussed further below Interest-driven Business Intelligence Server Systems Interest-driven business intelligence server systems in accordance with embodiments of the invention are configured to create jobs to request source data from interest-driven business intelligence systems based upon received reporting data requirements and to create reporting data using the received source data. An interest-driven business intelligence server system in accordance with an embodiment of the invention is conceptually illustrated in FIG. 2. The interest-driven business intelligence server system 200 includes a processor 210 in communication with memory 230. The interest-driven business intelligence server system 200 also includes a network interface 220 configured to send and receive data over a network connection. In a number of embodiments, the network interface 220 is in communication with the processor 210, and/or the memory 230.

In several embodiments, the memory 230 is any form of storage storing a variety of data. In the illustrated embodiment, the memory 230 also stores an interest-driven business intelligence application 232 that, when read by the processor, directs the processor 210 to perform a variety of interest-driven business intelligence processes. In many embodiments, interest-driven business intelligence processes include efficiently creating jobs using an interest-driven data pipeline to retrieve source data 234 from an interest-driven business intelligence system based upon redundancies between reporting data requirements and existing reporting data schemas and/or source data schemas. In a variety of embodiments, interest-driven business intelligence processes include generating and/or iteratively updating reporting data 238 based upon incrementally received source data. In several embodiments, interest-driven business intelligence processes include creating jobs using an interest-driven data pipeline to retrieve updates to existing source data 234 and/or aggregate data 236 from an interest-driven business intelligence system based upon the content of the existing source data 234, aggregate data 236, reporting data 238, and/or metadata describing data available from an interest-driven business intelligence system. A number of interest-driven business intelligence processes not specifically described above may be utilized in accordance with the requirements of specific applications in accordance with embodiments of the invention. The memory 230 can further includes aggregate data storage storing data received by the interest-driven business intelligence server system 200, including, but not limited to, aggregate data, source data, and reporting data. In a variety of embodiments, the aggregate data storage is configured as a data mart.

In many embodiments, any of the data and/or applications stored in memory 230 are stored using an external server system and received by the interest-driven business intelligence server system 200 using the network interface 220. External server systems in accordance with a variety of embodiments include, but are not limited to, interest-driven business intelligence systems, distributed computing platforms, and interest-driven data sharing server systems. In several embodiments, the processor 210 transmits jobs using the network interface 220.

Figure 2:
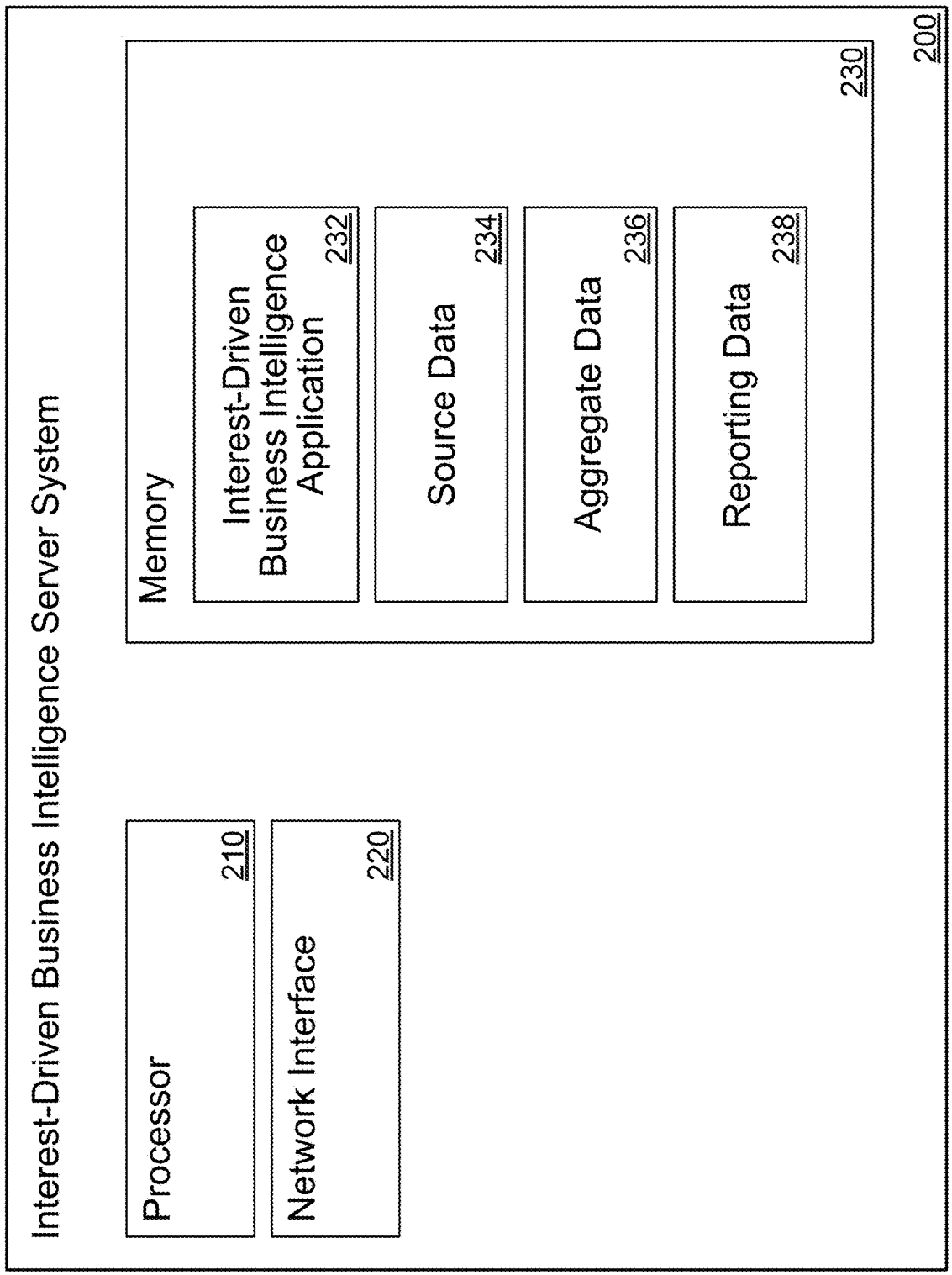
FIG. 2 is a conceptual illustration of a processing system in an interest-driven business intelligence server system in accordance with an embodiment of the invention.

Although a specific architecture for an interest-driven business intelligence server system in accordance with an embodiment of the invention is conceptually illustrated in FIG. 2, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Interest-Driven Business Intelligence Data Visualization System

Interest-driven business intelligence data visualization systems in accordance with embodiments of the invention can generate reporting data requests based upon user inputs as well to provide visualization of reporting data received from an interest-driven business intelligence server system. An interest-driven business intelligence data visualization system in accordance with an embodiment of the invention is conceptually illustrated in FIG. 3. The interest-driven business intelligence data visualization system 300 includes a processor 310 in communication with memory 330. The interest-driven business intelligence data visualization system 300 also includes a network interface 340 capable of sending and receiving data over a network connection. In a number of embodiments, the network interface 340 is in communication with the processor 310 and/or the memory 330.

In several embodiments, memory 330 is any form of storage that stores a variety of data, including, but not limited to, reporting data 334 and rendered display data 336. In the illustrated embodiment, memory 330 also stores an interest-driven business intelligence visualization application 332 that, when read by the processor, directs the processor 310 to perform a variety of interest-driven business intelligence processes. In many embodiments, interest-driven business intelligence visualization processes include generating reporting data requirements and/or generating displays of reporting data based upon reporting data requirements 338. In a variety of embodiments, interest-driven business intelligence visualization processes include a display rendering process that may further include a table displaying process, described in more detail below in accordance with embodiments of the invention.

Figure 3:
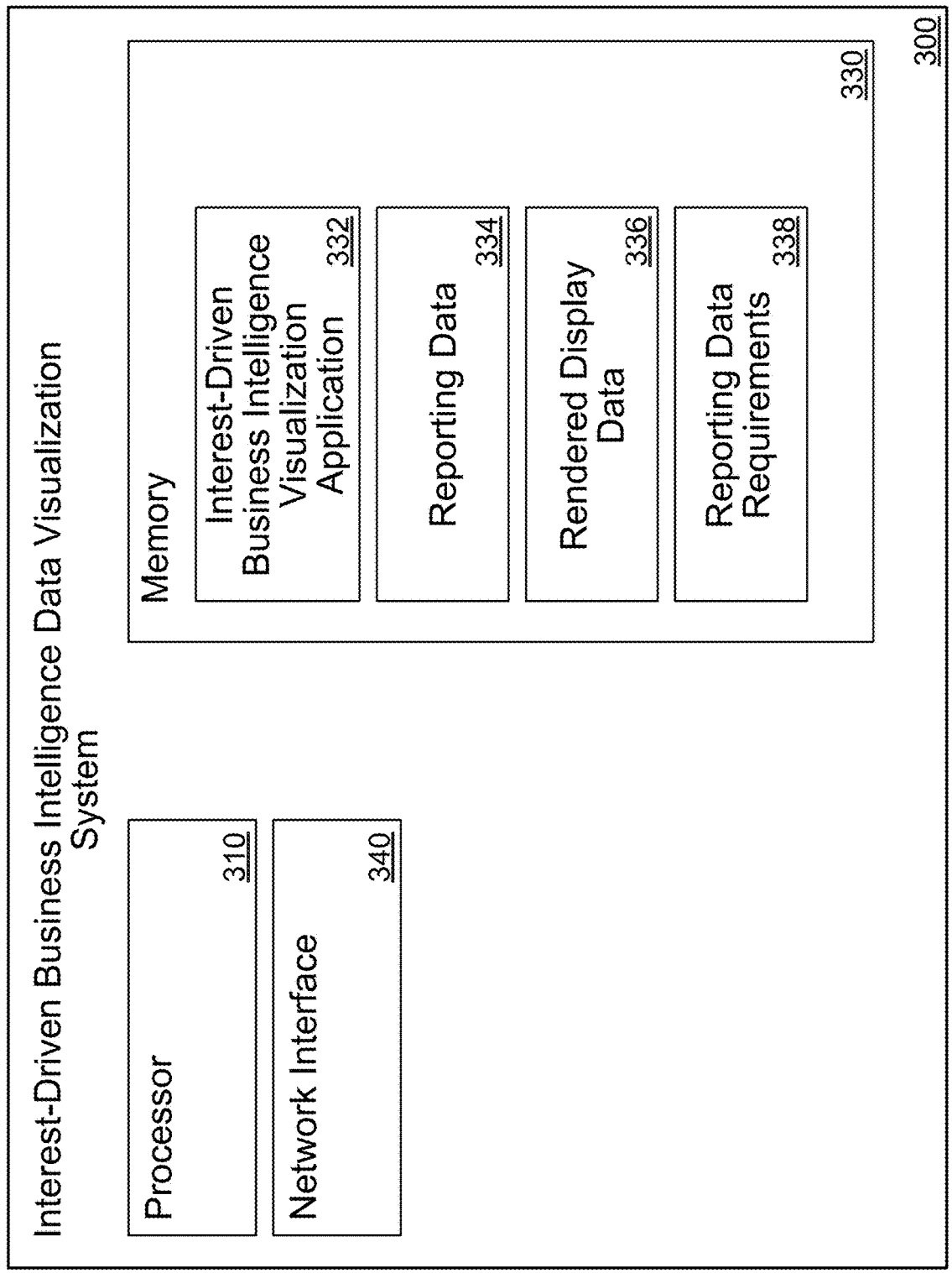
FIG. 3 is a conceptual illustration of a processing system in interest-driven business intelligence data visualization system in accordance with an embodiment of the invention.

Although a specific architecture for an interest-driven business intelligence data visualization system in accordance with an embodiment of the invention is conceptually illustrated in FIG. 3, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Process for Rendering Displays for a User Interface

Figure 4:
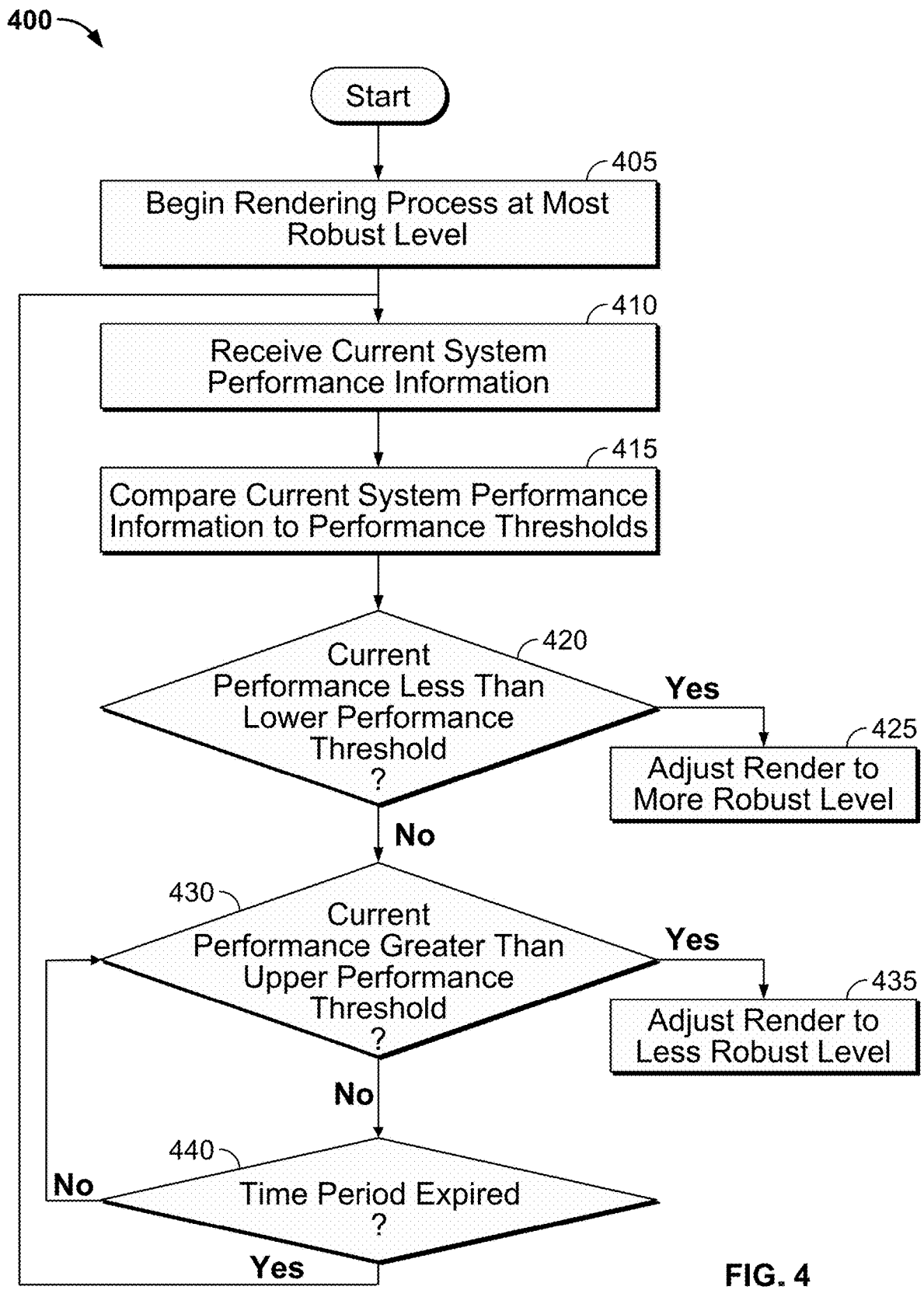
FIG. 4 is a flow chart illustrating a process for presenting visualization of reporting data in a table in accordance with an embodiment of the invention.

In accordance with some embodiments of the invention, an interest-driven business intelligence data visualization system may change the level of rendering performed by a display generating process based upon the system performance information. In this manner, the interest-driven business intelligence data visualization system provides high quality displays when there is little demand on system resources and lowers the quality of the displays when the demand on system resources are greater. Thus, the process sacrifices the user experience for system demands. For example, CPU resources may be in great demand when a large reporting dataset is being presented. As such, a rendering processing in accordance with some embodiments of the invention, would reduce the level of robustness of the rendering to provide the best rendered displays possible given the current demand on network resources. A process for adjusting the level of rendering for displays performed based upon the current system performance information in accordance with an embodiment of the invention is shown in FIG. 4.

In the process 400, the rendering process begins using the most robust level of rendering (405). For purposes of this discussion, robustness of the rendering process relates to the level of detail provided in the rendered displays. A more robust display will have more precision and detail than a less robust display. The process receives current system performance information (410). In accordance with some embodiments, the current system performance information is received from a network resource monitoring process. In accordance with a number of embodiments, the current system performance information is determined by the rendering process. In accordance with several embodiments, the current system performance information is determined based upon the size of the reporting dataset being presented. In accordance with some embodiments, the current performance information includes one parameter such as, but not limited to amount of CPU processing capability is in use. In accordance with embodiments, the current performance information includes more than one parameter such as but not limited, CPU usage, RAM usage, and the like.

The current performance information is compared to a lower system performance threshold and/or an upper system performance threshold for the current rendering process level (415). For purposes of the discussion, the lower system performance threshold is the lowest system performance level for the current system performance information for the current rendering process level and the upper system performance threshold is the greatest performance level that is included in the current rendering level. Furthermore, system performance level is a metric of the availability of current system resources where a low system performance level indicates that there are more systems resources available for use and a higher system performance level indicates a lesser amount of systems resources available for use. In accordance with some embodiments, only the upper system performance threshold is tested for the most robust rendering level and only the lower system performance threshold is tested for the least robust rendering level. In accordance with some embodiments where the current system performance information includes more than one parameter, each parameter may be compared to a corresponding current system threshold value and evaluated accordingly. In accordance with some other embodiments, a composite current system performance value is determined from the more than one current system performance parameters and compared to composite system performance threshold values.

If the current system performance information is less than lower system performance threshold (420), the current rendering level is moved to a more robust rendering level (425). The move to a more robust level is support because system resources have become available as indicated by the current system performance information. If the current system performance information is greater than the upper system performance threshold (430), the current rendering level is moved to a lesser robust rendering level (435). In accordance with some embodiments, three different rendering levels are provided: an animation level, an intermediate level, and a progressive level. The animation level is the most robust of the rendering levels and immediately renders all frames of the display to provide a fluid smooth display. The intermediate level is less robust rendering level and only renders frames with a state transition in the frame other intermediate frames are dropped. The result is a less fluid display. However, the display still responds to a current state of the display. The least robust level of rendering is the progressive level. In the progressive level of rendering, the rendering process only renders a portion of the data in each frame. This gives an immediate feedback on the information being rendered, may be used to provide an estimated time to complete the rendering and allows the rendering to be canceled. One skilled in the art will recognize that any number of levels of rendering can be provided depending on the ability of the interest-driven business intelligence data visualization system and design choices made by the providers of the interest-driven business intelligence system. The process is then periodically repeated (440) from the receiving of the current system performance information (410). In accordance with some embodiments, the process is repeated in a manner that provides 60 frames per second. However, other frame rates may be provided without departing from this invention.

Although a specific process for rendering display in an interest-driven business intelligence data visualization system is illustrated in FIG. 4, any of a variety of processes can be utilized in accordance with embodiments of the invention.

Table Scrolling Rendering Process

In accordance with some embodiments of the invention, an interest-driven business intelligence data visualization system provides a display of a table that can accurately display the current position of the display within a large dataset represented by a table. For purposes of this discussion, a large dataset is a dataset that may have more than a million rows of information. A table display rendering process in accordance with some of these embodiments uses a rending loop that continuously determines the position of within the table of the dataset and renders a current viewport of for the current position. In a variety of embodiments, the rendered viewport is stored using rendered display data. A process for render displays of tables in accordance with an embodiment of this invention is shown in FIG. 5.

In the process 500, the process receives scrolling information for the table (505). The scrolling information may be coordinate changes in the position within the table, velocity of movement, along the table, an input interaction or any other information that can indicate a change of position within the table. The scrolling information is then used to determine a current location within the table (510). A current viewport for the current location within the table is determined (515). The current viewport indicates that information that is displayed based upon the current location within the table. The current viewport is then rendered and provided to the display (520). The process then determines whether the scrolling is complete. In some embodiments, the determination of scrolling is complete may be made based upon the receipt of a particular input or based upon the lack of inputs received requesting movement. If scrolling is complete the process ends. If scrolling is not complete, the process repeats after a predetermined amount of time (525) from the reception of the scrolling information (505). In accordance with some embodiments, the amount of time is determined based upon a desired frame rate for the display. In other embodiments, the time may be determined by the amount of data that is present in the viewport and the time needed to render the viewport.

Figure 5:
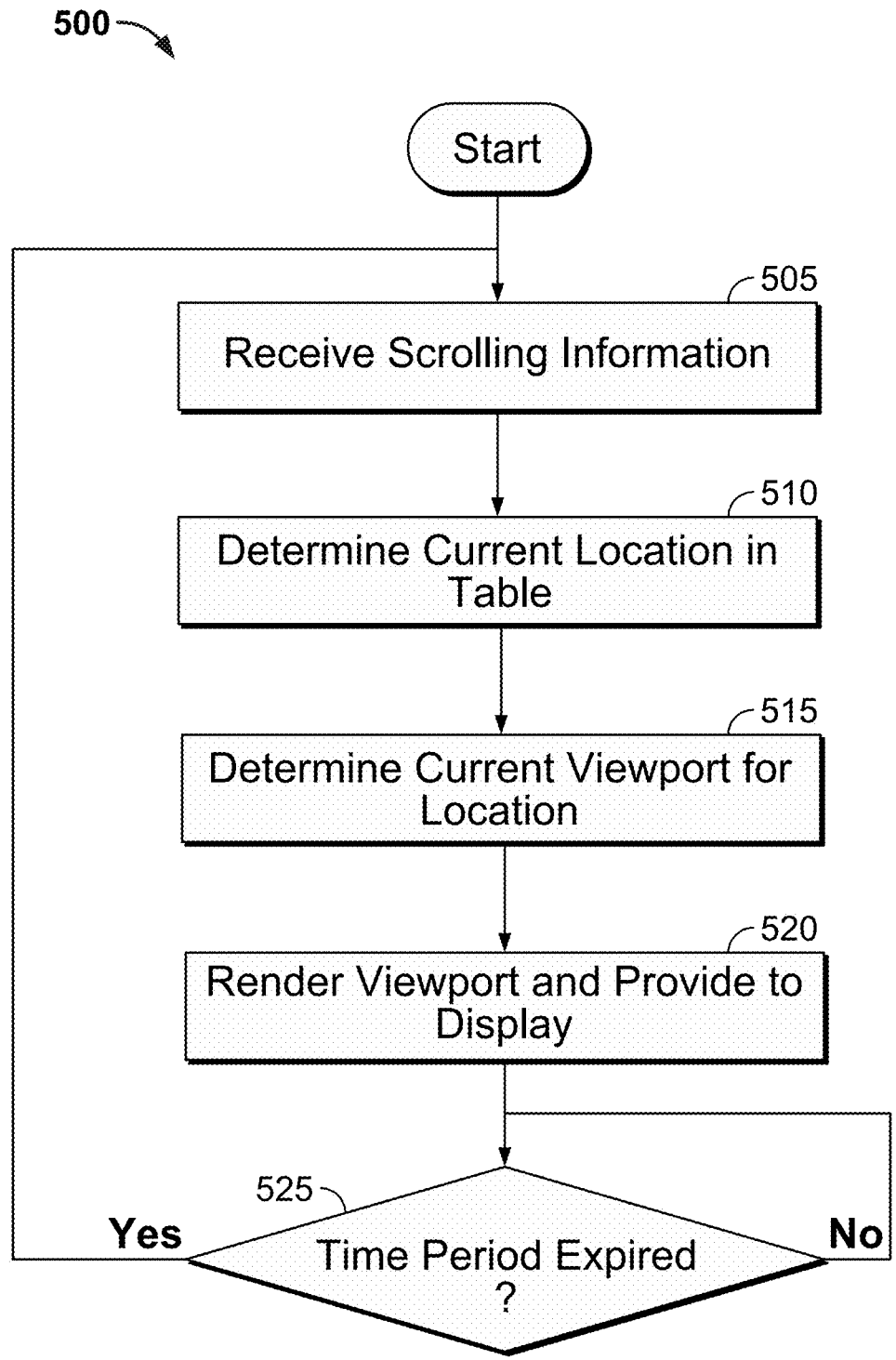
FIG. 5 is a flow chart illustrating a process for rendering visualizations of reporting data using an interest-driven business intelligence system in accordance with an embodiment of the invention.

Although a specific process for providing a display of scrolling in a table in interest-driven data visualization systems is illustrated in FIG. 5, any of a variety of processes can be utilized in accordance with embodiments of the invention.

Process for Record Look-Up from a Display

Figure 6:
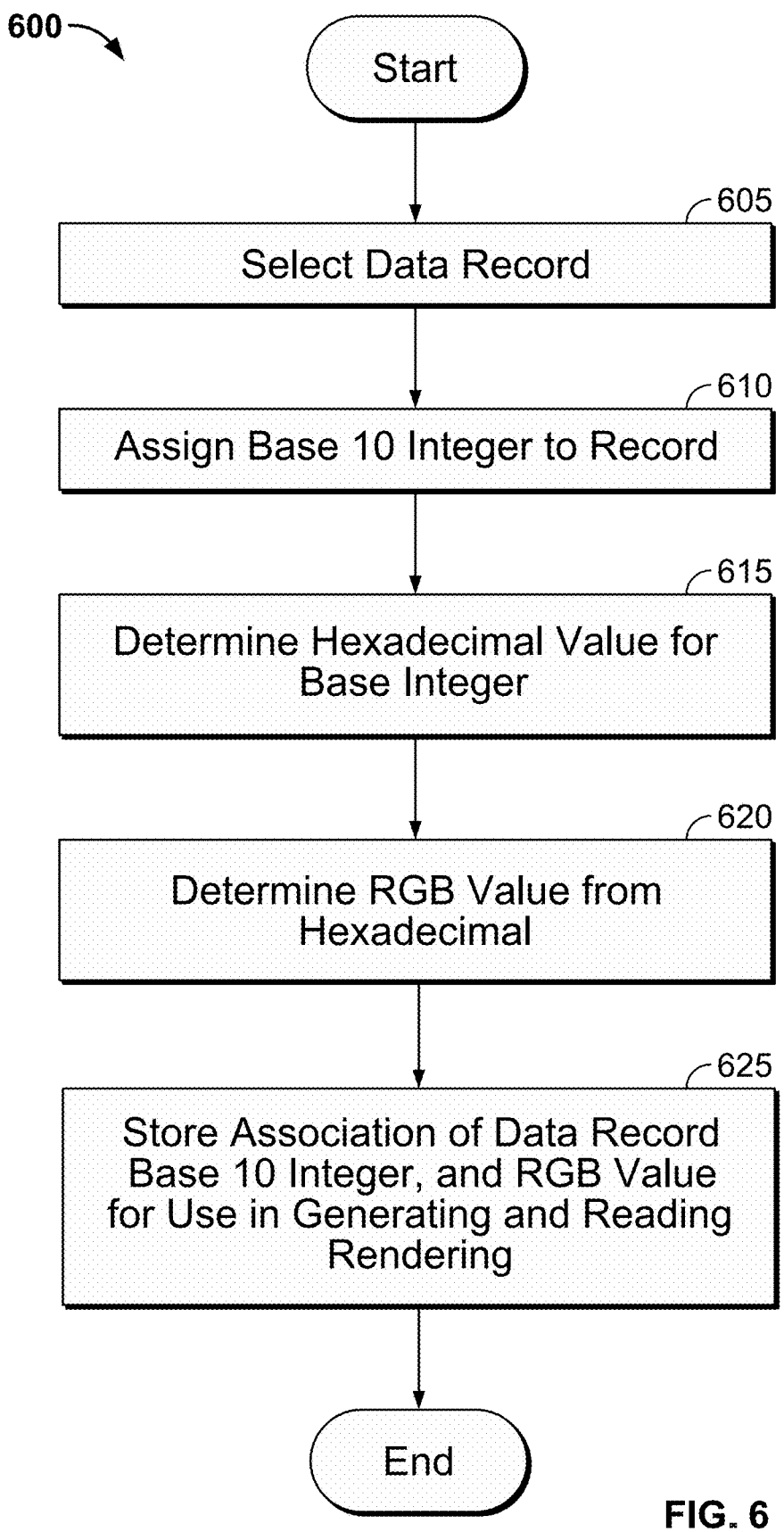
FIG. 6 illustrates a process performed by an interest-driven business intelligence data visualization system to associate a data record with a RGB value in accordance with an embodiment of the invention.
Figure 7:
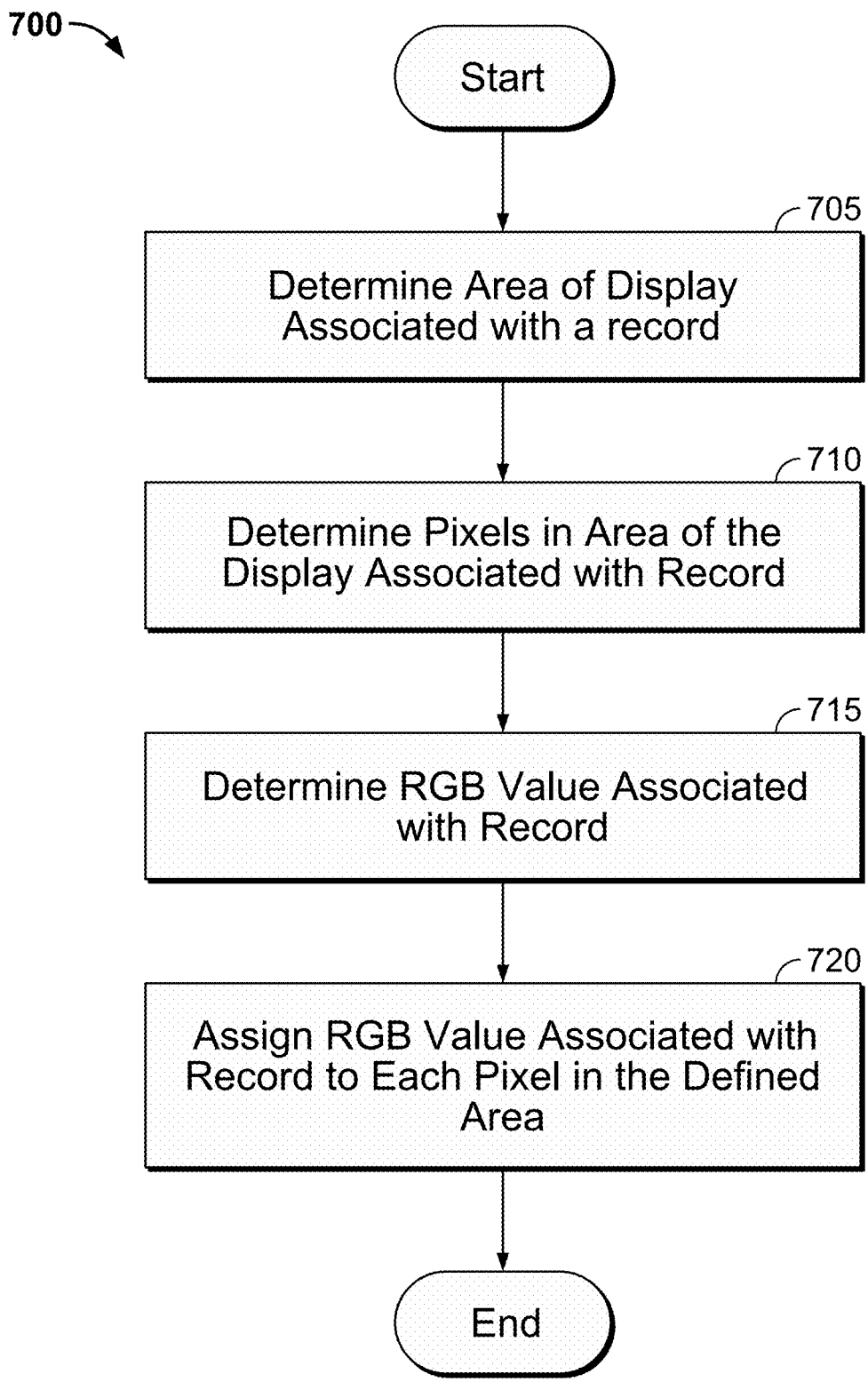
FIG. 7 illustrates a process performed by an interest-driven business intelligence data visualization system for generating a display that uses RGB values to indicate a particular referenced data record in accordance with an embodiment of the invention.
Figure 8:
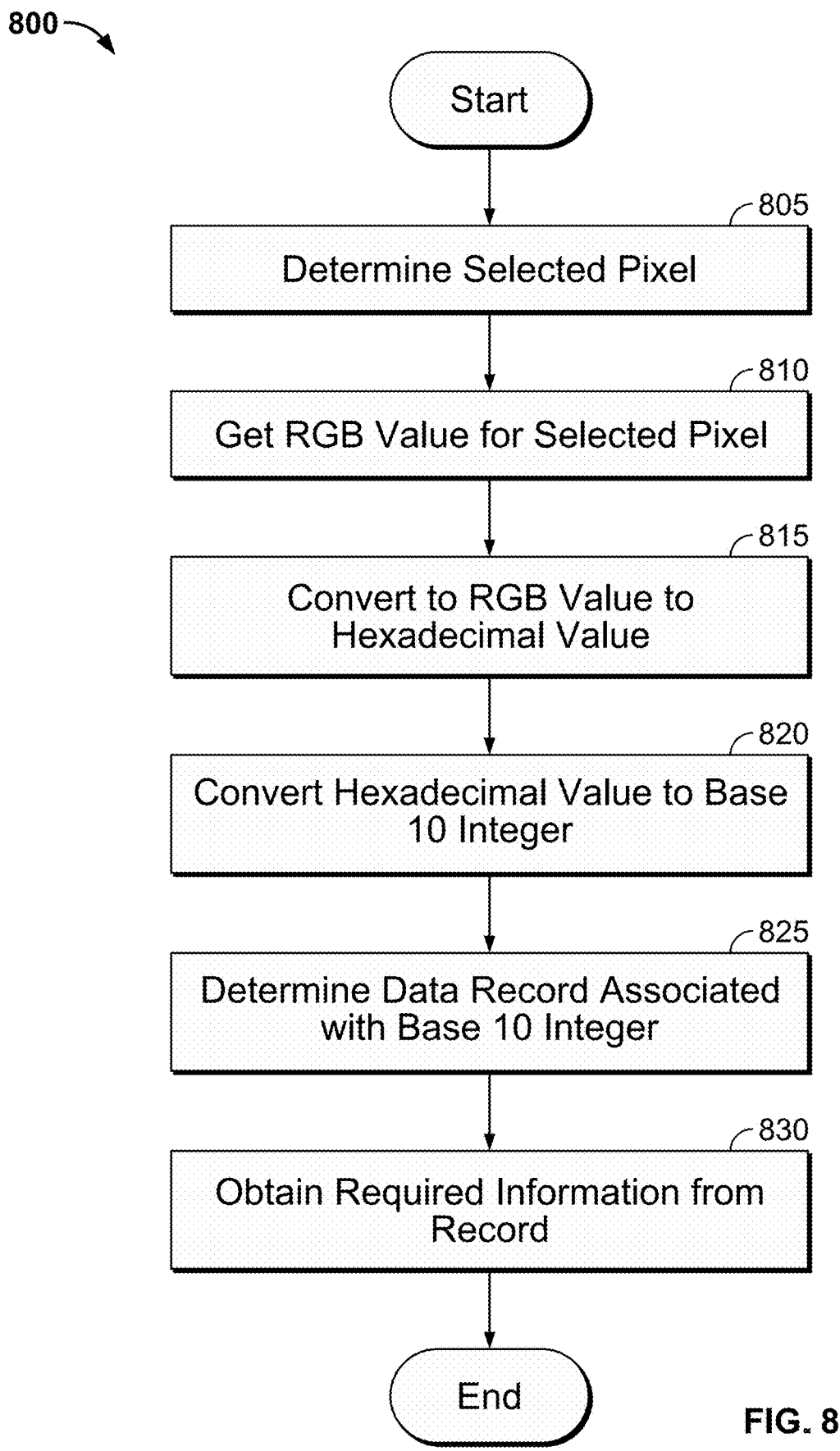
FIG. 8 illustrates a process performed by an interest-driven business intelligence data visualization system for determining a data record referenced by an area of a display in accordance with an embodiment of the invention.

In accordance with some embodiments of the invention, a process is provided for associating a data record with a pixel and/or group of pixels on a display. A display of reporting data may include references to a large number of pieces of data. Sometimes the number of pieces of data may be well into the millions. As such, there is a need for uniquely identifying each data record associated with a piece of data on the display. To do so, a rendering system associates a particular data record with a particular pixel or group of pixels in the display in accordance with some embodiments of the invention. In some rendering schema, such as HTML5 Canvas, the Red Green Blue (RGB) colors support 256 values per channel or color. Thus, there are 16.8 million different RGB value combinations available using HTML5 Canvas. One skilled in the art will recognize that the values available may be different for other schema. Thus, associating each data record with a particular RGB value in the schema provides a number of unique identifiers in the tens of millions. Processes for using an RGB value to indicate a data record associated with a pixel or group of pixels in accordance with some embodiments of the invention is shown by FIGS. 6-8.

In order to use the RGB values to indicate a data record in accordance with some embodiments of the invention, a data record must be first associated with a RGB value. A process performed by an interest-driven business intelligence data visualization system to associate a data record with a RGB value in accordance with an embodiment of the invention is shown in FIG. 6.

Process 600 includes selecting a data record (605). The data record may be a record from reporting data being used to generate the display in accordance with many embodiments. In accordance with a number of embodiments, the data record may be selected from a subset of the reporting selected for the display. In accordance with various other embodiments, the data record may be for source data, aggregate data, or raw data used to generate the display.

A unique base 10 integer is assigned to the data record (610). In accordance with some embodiments, the base 10 integer is selected from a range of integers used for data having similar properties. In accordance with many embodiments, the base 10 integer is an integer randomly selected. In accordance with a number of embodiments, the base 10 integers may be assigned in order of sequentially starting for a predetermined integer such as, but not limited to 0. The base 10 integer is then converted to a hexadecimal value (615). One skilled in the art will recognize that other base systems may be used if the schema supports a different number of values per channel. The hexadecimal value is then used to determine an RGB value (620). In accordance with some embodiments, first two digits of the hexadecimal value are assigned to a first or R channel, the second two hexadecimal digits are assigned to a second or G channel, and the third two hexadecimal digits are assigned to a third or B channel.

The association of the data record to the base 10 integer, hexadecimal value, and/or RGB value is then stored in memory (625) for use in generating displays and retrieving data records as described further below. In a number of embodiments, rendered display data is stored using the memory of the interest-driven business intelligence data visualization system providing the displayed data. Process 600 may be repeated for each data record being referenced in the display or displays being generated.

Although a specific process for associating a data record with a RGB value in accordance with an embodiment of the invention is shown in FIG. 6, any of a variety of processes can be utilized in accordance with embodiments of the invention.

The association between a data record and a RGB color may be now used to generate a display and subsequently to retrieve the data record of interest in a portion of the display. The use of RGB colors is useful as the amount of memory needed to store the associations linearly grows with the number of records associated with the display further complexity of determining the data record associated with an area is on the order of 1. A process performed by an interest-driven business intelligence data visualization system for generating a display that uses RGB values to indicate a particular referenced data record in accordance with an embodiment of the invention is shown in FIG. 7.

Process 700 includes determining an area of a display associated with a particular record (705). The pixels of the display in the determined area associated with the particular record are then determined. In accordance with some various embodiments of the invention, the area includes at least one pixel. The RGB value associated the data record is then determined. In accordance with some embodiments, the RGB value for the record is read from memory. In accordance with some other embodiments, a hexadecimal value associated with the data record is read from memory and used to determine the RGB value. In still other embodiments, the base 10 integer associated with the record is read, converted to a hexadecimal value and the RGB value is determined.

The RGB value associated with the data record is assigned to the pixel or group of pixel in the area associated with the data record. Process 700 then ends. In accordance with some embodiments, the process 700 is performed for each particular area in the display that is associated with a particular data record.

Although a specific process for generating a display that uses RGB values to indicate a particular referenced data record in accordance with an embodiment of the invention is shown in FIG. 7, any of a variety of processes can be utilized in accordance with embodiments of the invention.

Figure 9:
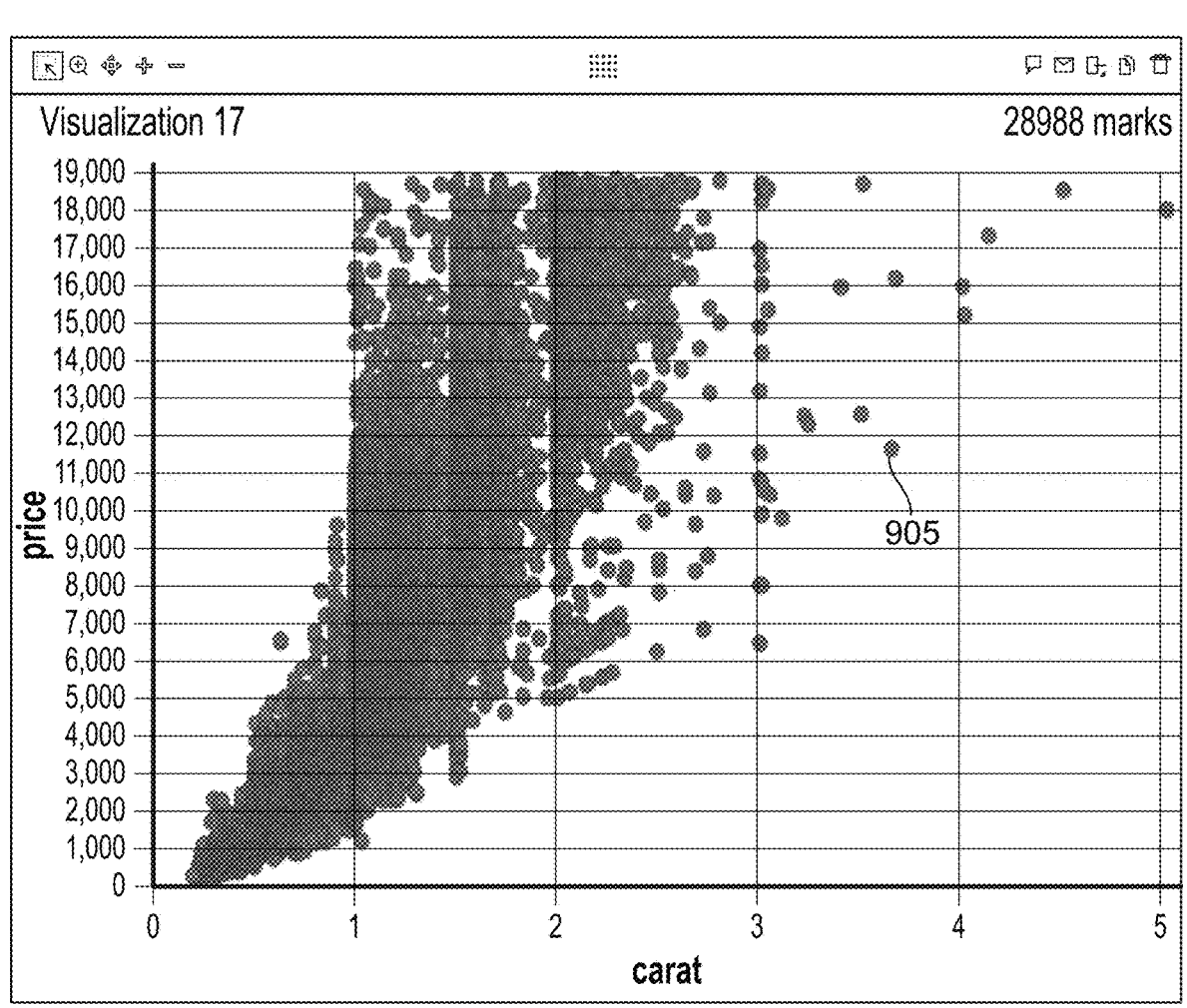
FIGS. 9 and 10 illustrate displays having areas that are associated with a data record in accordance with an embodiment of the invention.
Figure 10:
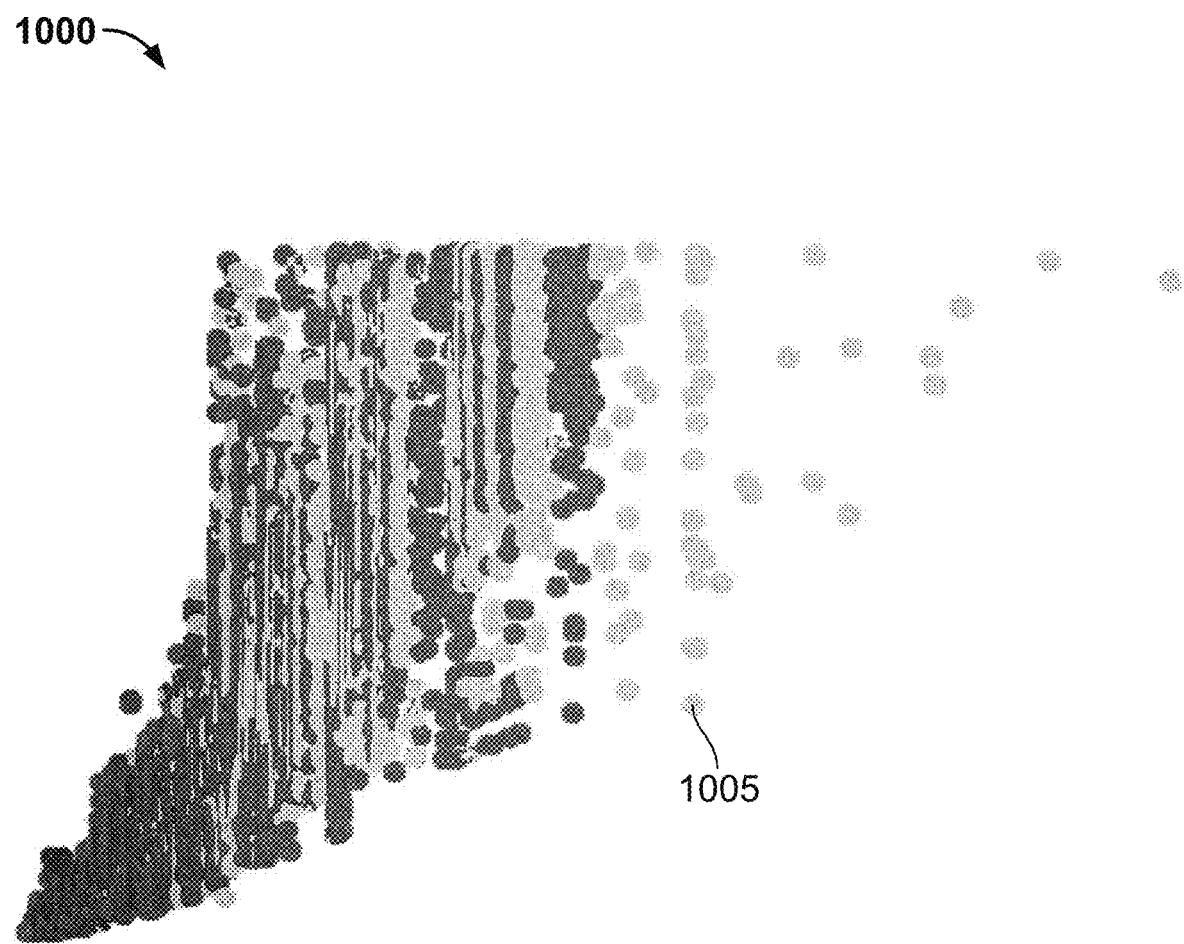

Displays that are generated in accordance with a generating process such as the process described above with respect to FIG. 7 are shown in FIGS. 9 and 10. In displays 900 and 1000, each circle exemplified by circles 905 and 1005 are single pixels where each pixel has an RGB value that is associated with a particular data record.

After the display is generated, the display may be presented by an interest-driven business intelligence data visualization system for use by a user. The user may then want to select a particular data record referenced on the display and/or display highlights the current record being indicated by a pointer or similar icon on the display. To do so, an interest-driven business intelligence data visualization system must determine the record being reference to obtain the data from the record to generate a more detailed display. A process performed by an interest-driven business intelligence data visualization system for determining a data record referenced by an area of a display in accordance with an embodiment of the invention is shown in FIG. 8.

In process 800, the process determines a selected pixel (805). The determination may be made from an input by a user using an I/O device, such as a mouse, a touch screen, or other type of device. The RGB color value of the selected pixel is then obtained (810). In accordance with some other embodiments where the RGB color value and data record are associated, the RGB can be used to look-up the association in memory and determine the referenced data record.

The RGB value is converted to a hexadecimal value (815). In accordance with some embodiments, this may be done in accordance with the manner in which the hexadecimal value was used to determine the RGB value such as, but not limited to, the manner of determining the RGB value discussed with reference to FIG. 6. In a number of embodiments where an association of the hexadecimal value and the data record is store, the determined hexadecimal value may be used to determine the data record.

The hexadecimal value is converted into a base 10 integer (820). The base 10 integer is then used to determine the data record associated with the base 10 integer (825). As noted above, other embodiments may use other associated related to the RGB value to determine the record. Process 800 retrieves the required information from the determined data record for use (830) and process 800 ends.

Although a specific process for determining a data record referenced by an area of a display in accordance with an embodiment of the invention is shown in FIG. 8, any of a variety of processes can be utilized in accordance with embodiments of the invention.

Figure 11:
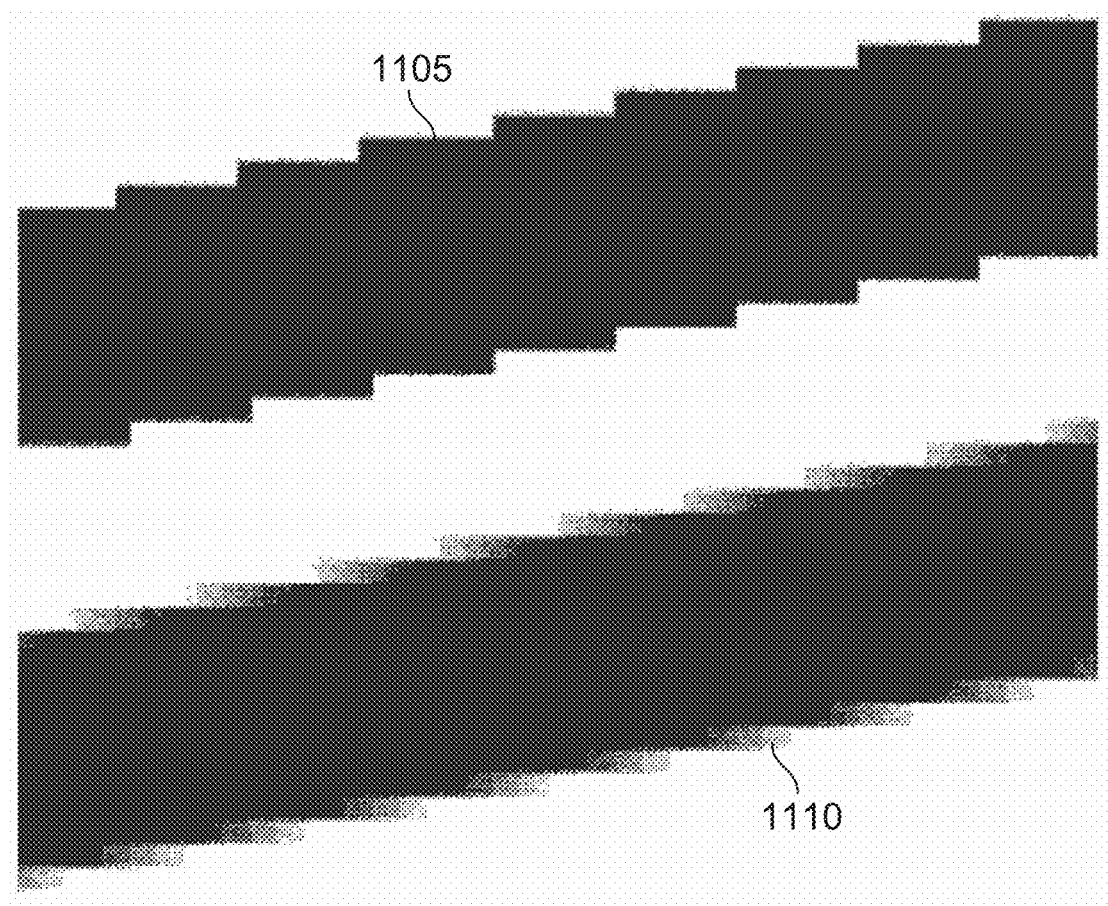
FIG. 11 illustrates lines that are aliased and anti-aliased.

One problem that may arise in the use of the RGB value to identify referenced data records is that some schema including, but not limited to, HTML5 Canvas have automatic anti-aliasing processes to blend edges along the edge of shapes when the shapes overlap one another. This changes the RGB values of the pixels that can result in improper data record being referenced and/or an error of not being able to ascertain a reference data record. An example of an anti-aliased line is shown by line 1110 shown in FIG. 11. To overcome this problem, Aliased Bitmap Rasterization may be applied to the display to ensure that all areas are rendered with whole pixels along the edges of shapes via different techniques such as, but not limited to Bresenham Rasterization. An example of an aliased line is line 1105 of FIG. 11 that shows that the pixels along the edges are one color.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person except where expressly required. Accordingly, the scope of the invention should be determined not by the embodiments illustrated, but by the appended claims and their equivalents.

What is claimed is:

1. An interest-driven business intelligence data visualization system comprising:
   a processor; and
   a memory for storing instructions for execution by the processor so that the processor is configured to:
   receive current system performance level information that indicates an amount of system resources available;
   determine a relationship between the current system performance level information and one or more threshold values; and,
   in response to the relationship between the current system performance level information and the one or more threshold values, adjust a rendering level based at least in part upon the relationship between the current system performance level information and the one or more threshold values, wherein the rendering level comprises an intermediate level that renders frames that include a state transition in a frame and drops other frames.

2. The system of claim 1, wherein the current system performance level information is received from a resource monitoring process.

3. The system of claim 1, wherein the current system performance level information is determined by a rendering process.

4. The system of claim 1, wherein the current system performance level information is determined based at least in part on a size of a reporting dataset.

5. The system of claim 1, wherein the current system performance level information comprises CPU usage.

6. The system of claim 1, wherein the current system performance level information comprises RAM usage.

7. The system of claim 1, wherein the current system performance level information includes more than one parameter, wherein each parameter is compared to a corresponding threshold value.

8. The system of claim 1, wherein the relationship comprises a value of the current system performance level information being greater than a threshold value of the one or more threshold values.

9. The system of claim 1, wherein the relationship comprises a value of the current system performance level information being less than a threshold value of the one or more threshold values.

10. The system of claim 1, wherein adjusting the rendering level comprises adjusting the rendering level to a more robust rendering level.

11. The system of claim 1, wherein adjusting the rendering level comprises adjusting the rendering level to a less robust rendering level.

12. The system of claim 1, further comprising repeating receiving, determining, and adjusting, if appropriate, in a manner to accommodate a frame rate.

13. The system of claim 1, wherein adjusting the rendering level comprises changing from the intermediate level to an animation level or changing from the animation level to the intermediate level.

14. The system of claim 1, wherein adjusting the rendering level comprises changing from the intermediate level to a progressive level or changing from the progressive level to the intermediate level.

15. An interest-driven business intelligence data visualization method comprising:

receiving current system performance level information that indicates an amount of system resources available;

determining, using a processor, a relationship between the current system performance level information and one or more threshold values; and, in response to the relationship between the current system performance level information and the one or more threshold values, adjusting a rendering level based at least in part upon the relationship between the current system performance level information and the one or more threshold values, wherein the rendering level comprises an intermediate level that renders frames that include a state transition in a frame and drops other frames.

16. A computer program product for an interest-driven business intelligence data visualization, the computer program product being embodied in a non-transitory computer readable storage medium and comprising computer instructions for execution by a processor for:

receiving current system performance level information that indicates an amount of system resources available;

determining, using a processor, a relationship between the current system performance level information and one or more threshold values; and, in response to the relationship between the current system performance level information and the one or more threshold values, adjusting a rendering level based at least in part upon the relationship between the current system performance level information and the one or more threshold values, wherein the rendering level comprises an intermediate level that renders frames that include a state transition in a frame and drops other frames.

* * * * *